(12) United States Patent
    Su

(10) Patent No.: US 12,631,930 B2
(45) Date of Patent: May 19, 2026

(54) ELECTROCHROMIC DEVICE AND ELECTRONIC DEVICE

(71) Applicant: VIVO MOBILE COMMUNICATION CO., LTD., Dongguan (CN)

(72) Inventor: Zipeng Su, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 309 days.

(21) Appl. No.: 18/370,382

(22) Filed: Sep. 19, 2023

(65) Prior Publication Data

US 2024/0004253 A1     Jan. 4, 2024

Related U.S. Application Data

(63) Continuation of application No. PCT/CN2022/081597, filed on Mar. 18, 2022.

(30) Foreign Application Priority Data

Mar. 24, 2021    (CN) .......................... 202110313813.6

(51) Int. Cl.
    *G02F 1/15*          (2019.01)
    *F21V 14/00*        (2018.01)
                (Continued)
(52) U.S. Cl.
    CPC .............. *G02F 1/163* (2013.01); *G02F 1/161* (2013.01)
(58) Field of Classification Search
    CPC ...... G02F 1/1523; G02F 1/1533; G02F 1/155; G02F 1/0102; G02F 1/163; G09G 3/16
                (Continued)

(56) References Cited

U.S. PATENT DOCUMENTS

2011/0260961 A1    10/2011    Burdis
2012/0154891 A1*    6/2012    Yeh ........................ H04N 13/31
                                                              359/265
                (Continued)

FOREIGN PATENT DOCUMENTS

CN          106406595 A        2/2017
CN          108681175 A        10/2018
                (Continued)

OTHER PUBLICATIONS

International Search Report issued in corresponding International Application No. PCT/CN2022/081597, mailed Jun. 29, 2022, 6 pages.

(Continued)

*Primary Examiner* — Dawayne Pinkney
(74) *Attorney, Agent, or Firm* — IPX PLLC

(57)                ABSTRACT

An electrochromic device and an electronic device are provided. The electrochromic device includes a first substrate layer, a first conductive layer, an electrochromic layer, a second conductive layer, and a second substrate layer stacked in sequence. The first conductive layer includes a first conductive area and a first control module, where the first control module is separated from the first conductive area. The second conductive layer includes a second conductive area and a second control module, where the second control module is separated from the second conductive area and opposite to the first control module. The electrochromic layer includes a first color change area and a second color change area, where the first color change area is opposite to the first control module and the second control module, and the second color change area is opposite to the first conductive area and the second conductive area.

18 Claims, 8 Drawing Sheets

(51) Int. Cl.

| | | |
|---|---|---|
| *G02B 26/00* | (2006.01) |
| *G02F 1/157* | (2006.01) |
| *G02F 1/163* | (2006.01) |
| *G09G 3/19* | (2006.01) |
| *G02F 1/161* | (2006.01) |

(58) Field of Classification Search

USPC ................ 359/265–275, 277, 242, 245–247; 349/49, 105, 182–186; 345/49, 105; 438/929

See application file for complete search history.

(56) References Cited

U.S. PATENT DOCUMENTS

| | | | |
|---|---|---|---|
| 2014/0133006 A1 | 5/2014 | Malmstrom |
| 2018/0284555 A1* | 10/2018 | Klawuhn .......... G02F 1/133504 |

FOREIGN PATENT DOCUMENTS

| | | | | |
|---|---|---|---|---|
| CN | 109189261 A | | 1/2019 |
| CN | 110543055 A | | 12/2019 |
| CN | 110989260 A | | 4/2020 |
| CN | 111123603 A | | 5/2020 |
| CN | 111323979 A | | 6/2020 |
| CN | 111487830 A | | 8/2020 |
| CN | 112419879 A | | 2/2021 |
| CN | 112859474 A | | 5/2021 |
| JP | S5225672 A | | 2/1977 |
| JP | H03107991 A | | 5/1991 |
| JP | 2004045483 A | * | 2/2004 |
| JP | 2008165219 A | | 7/2008 |

OTHER PUBLICATIONS

First Office Action issued in related Chinese Application No. 202110313813.6, mailed Oct. 31, 2022, 6 pages.

Extended European Search Report issued in related European Application No. 22774128.7, mailed Jun. 19, 2024, 11 pages.

Notice of Reasons for Refusal issued in related Japanese Application No. 2023-552202, mailed Jun. 2, 2024, 12 pages.

* cited by examiner

| Cover plate |
| :---: |
| Upper substrate layer |
| Upper conductive layer |
| Lower substrate layer |
| Lower conductive layer |
| Electrochromic material layer |
| Electrolyte layer |
| Ion storage layer |
| Membrane switch conductive layer |

C

3028

6022
6026  } 602
6024

902

904
102
802

104

D-D

E

F

ELECTROCHROMIC DEVICE AND ELECTRONIC DEVICE

CROSS-REFERENCE TO RELATED APPLICATIONS

This application is a continuation of International Application No. PCT/CN2022/081597, filed on Mar. 18, 2022, which claims priority to Chinese Patent Application No. 202110313813.6, filed on Mar. 24, 2021. The entire contents of each of the above-referenced applications are expressly incorporated herein by reference.

TECHNICAL FIELD

This application relates to the field of electronic technologies, and specifically, to an electrochromic device and an electronic device.

BACKGROUND

At present, electrochromic technologies can perform color change and adjustment on the appearance of electronic devices based on user requirements, which brings great possibilities for the differentiation of the electronic devices. In the related art, as shown in FIG. 1, an electronic device includes a cover body and an electrochromic layer. The electrochromic layer includes an upper substrate layer, an upper conductive layer, a lower substrate layer, a lower conductive layer, an electrochromic material layer, an electrolyte layer, an ion storage layer, and a membrane switch conductive layer. The membrane switch conductive layer controls the upper conductive layer and the lower conductive layer to implement pattern display.

However, in the related art, only the color change of the entire electrochromic layer can be controlled to change the color of the cover body of the electronic device, and the color change mode is insufficiently flexible.

SUMMARY

An objective of embodiments of this application is to provide an electrochromic device and an electronic device.

According to a first aspect, an embodiment of this application provides an electrochromic device, including:

a first substrate layer, a first conductive layer, an electrochromic layer, a second conductive layer, and a second substrate layer.

The first substrate layer, the first conductive layer, the electrochromic layer, the second conductive layer, and the second substrate layer are stacked in sequence.

The first conductive layer includes a first conductive area and a first control module, where the first control module is separated from the first conductive area.

The second conductive layer includes a second conductive area and a second control module, where the second control module is separated from the second conductive area and opposite to the first control module.

The electrochromic layer includes a first color change area and a second color change area, where the first color change area is opposite to the first control module and the second control module, and the second color change area is opposite to the first conductive layer and the second conductive layer.

The first control module and the second control module are configured to control the color change of the first color change area.

According to a second aspect, an embodiment of this application provides an electronic device, including:

a cover plate; and the electrochromic device according to the first aspect, where the electrochromic device is disposed on the cover plate.

In the embodiments of this application, because the first control module and the first conductive area are independent of each other, and the second control module and the second conductive area are independent of each other, the color change of the first color change area and the color change of the second color change area on the electrochromic layer are independent. In other words, after the first control module and the second control module are electrified, the color change can be implemented on the first color change area on the electrochromic layer, and in a case that the first conductive area and the second conductive area are not electrified, the second color change area may not change with the first color change area, to implement a function of local color change of the electrochromic device and improve the flexibility of the color change mode.

DETAILED DESCRIPTION

Figures 1, 2:
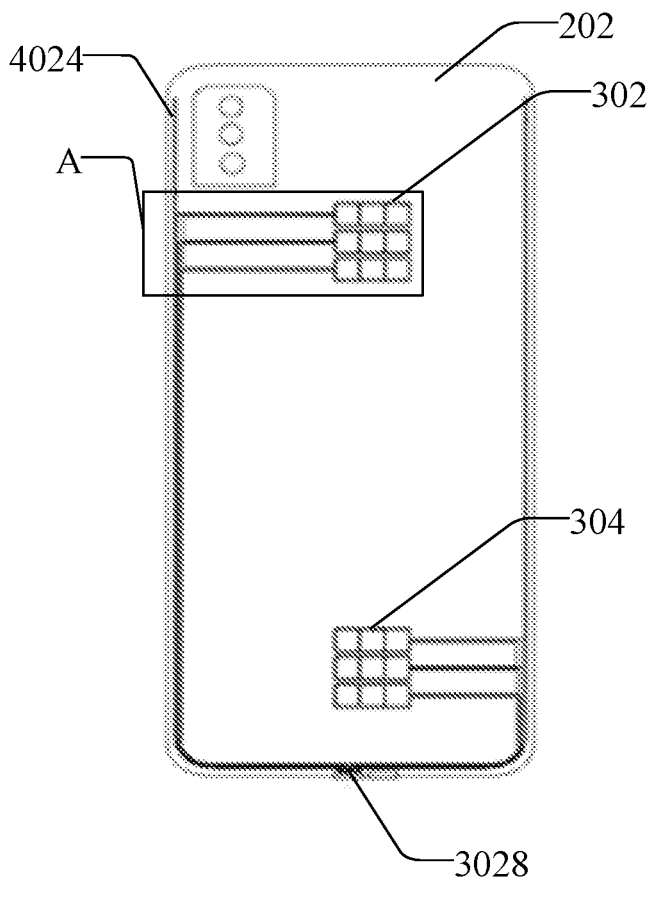
FIG. 1 is a schematic structural diagram of an electronic device in the related art.
FIG. 2 is a first schematic structural diagram of an electrochromic device according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. In addition, in the specification and the claims, "and/or" means at least one of the connected objects, and the character "I" generally indicates an "or" relationship between the associated objects.

An electrochromic device and an electronic device provided by the embodiments in this application are described below through embodiments and application scenarios thereof with reference to the accompanying drawings.

An embodiment of this application provides an electrochromic device, including: a first substrate layer, a first conductive layer, an electrochromic layer, a second conductive layer, and a second substrate layer. The first substrate layer, the first conductive layer, the electrochromic layer, the second conductive layer, and the second substrate layer are stacked in sequence. The first conductive layer includes a first conductive area and a first control module, where the first control module is separated from the first conductive area. The second conductive layer includes a second conductive area and a second control module, where the second control module is separated from the second conductive area and opposite to the first control module. The electrochromic layer includes a first color change area and a second color change area, where the first color change area is opposite to the first control module and the second control module, and the second color change area is opposite to the first conductive layer and the second conductive layer. The first control module and the second control module are configured to control the color change of the first color change area.

In this embodiment, the electrochromic device is sequentially disposed with the first substrate layer, the first conductive layer, the electrochromic layer, the second conductive layer, and the second substrate layer. The first conductive layer includes a first conductive area and at least one first control module, and each first control module is separated from the first conductive area, i.e. the first control module and the first conductive area are not connected and are independent of each other. The second conductive layer includes a second conductive area and at least one second control module, and each second control module is separated from the second conductive area, i.e. the second control module and the second conductive area are not connected and are independent of each other. The first control module and the second control module are symmetrical relative to the electrochromic layer, both the first control module and the second control module correspond to the first color change area of the electrochromic layer, and both the first conductive layer and the second conductive layer correspond to the second color change area of the electrochromic layer.

In this embodiment of this application, because the first control module and the first conductive area are independent of each other, and the second control module and the second conductive area are independent of each other, the color change of the first color change area and the color change of the second color change area on the electrochromic layer are independent. In other words, after the first control module and the second control module are electrified, the color change can be implemented on the first color change area on the electrochromic layer, and in a case that the first conductive area and the second conductive area are not electrified, the second color change area may not change with the first color change area, to implement a function of local color change of the electrochromic device and improve the flexibility of the color change mode.

In addition, the first control module and the second control module are further configured to sense a touch input of a user, that is, the first control module and the second control module can independently sense the touch input of the user relative to the first conductive area and the second conductive area, thereby implementing a function of local touch control of the electrochromic device and improving the flexibility of the touch control mode.

It should be noted that during sensing of the touch input, a corresponding group of first control modules and second control modules form a capacitor, and whether the group of control modules sense the touch input may be determined according to a capacitance value.

In some embodiments, when the electrochromic device is applied to a cover plate of the electronic device, a local pattern changeable function of the cover plate of the electronic device can be implemented, for example, time or another pattern is displayed on the cover plate of the electronic device, and the function of local display on the back of the electronic device is implemented, to achieve power saving of the electronic device and increase the function of the cover plate of the electronic device.

In an embodiment of this application, the first control module includes a plurality of first submodules, the plurality of first submodules are connected in parallel to each other, each first submodule includes a plurality of first control units, and the plurality of first control units are connected in sequence. The second control module includes a plurality of second submodules, where the plurality of second submodules are connected in parallel to each other, each second submodule includes a plurality of second control units, and the plurality of second control units are connected in sequence.

In this embodiment, the first control module and the second control module are respectively disposed with small control units, and local color change is implemented by electrifying each the small control unit to display a required pattern, and sensing of a touch input is determined by signal detection of the small control unit. Compared with the mode of using a membrane switch to control conduction in the related art, the foregoing color change and touch control modes of this application have lower cost and lower power consumption.

In an embodiment of this application, the plurality of first control units are arranged in a first direction; and the plurality of second control units are arranged in a second direction, where the second direction is perpendicular to the first direction.

In this embodiment, the arrangement direction of the plurality of first control units is perpendicular to the arrangement direction of the plurality of second control units, and coordinates of each small control unit are positioned by the perpendicular arrangement directions. For example, the plurality of first control units are arranged laterally, and the plurality of second control units are arranged longitudinally, with an x coordinate in the lateral direction and a y coordinate in the longitudinal direction, to implement positioning of each small control unit and accurately and quickly determine areas where color changes and touch input is sensed.

In an embodiment, as shown in FIG. 2 to FIG. 10, the first substrate layer is an upper substrate layer 102, the second substrate is a lower substrate layer 104, the upper substrate layer 102 and the lower substrate layer 104 are opposite to each other, and the upper substrate layer 102 and the lower substrate layer 104 are glass, plastic resin, or the like.

The first conductive layer is attached to a surface of the upper substrate layer 102 facing the lower substrate layer 104, the second conductive layer is attached to a surface of the lower substrate layer 104 facing the upper substrate layer 102, and the electrochromic layer 502 is disposed between the first conductive layer and the second conductive layer.

The first conductive layer includes a first conductive area and at least one first control module. As shown in FIG. 2, the first conductive area is an upper conductive area 202, the number of the at least one first control module is two, and the first control modules are both laterally disposed. The at least one first control module includes a first lateral control module 302 and a second lateral control module 304, where the first lateral control module 302 and the second lateral control module 304 are both separated from the upper conductive area 202.

Figures 3, 4:
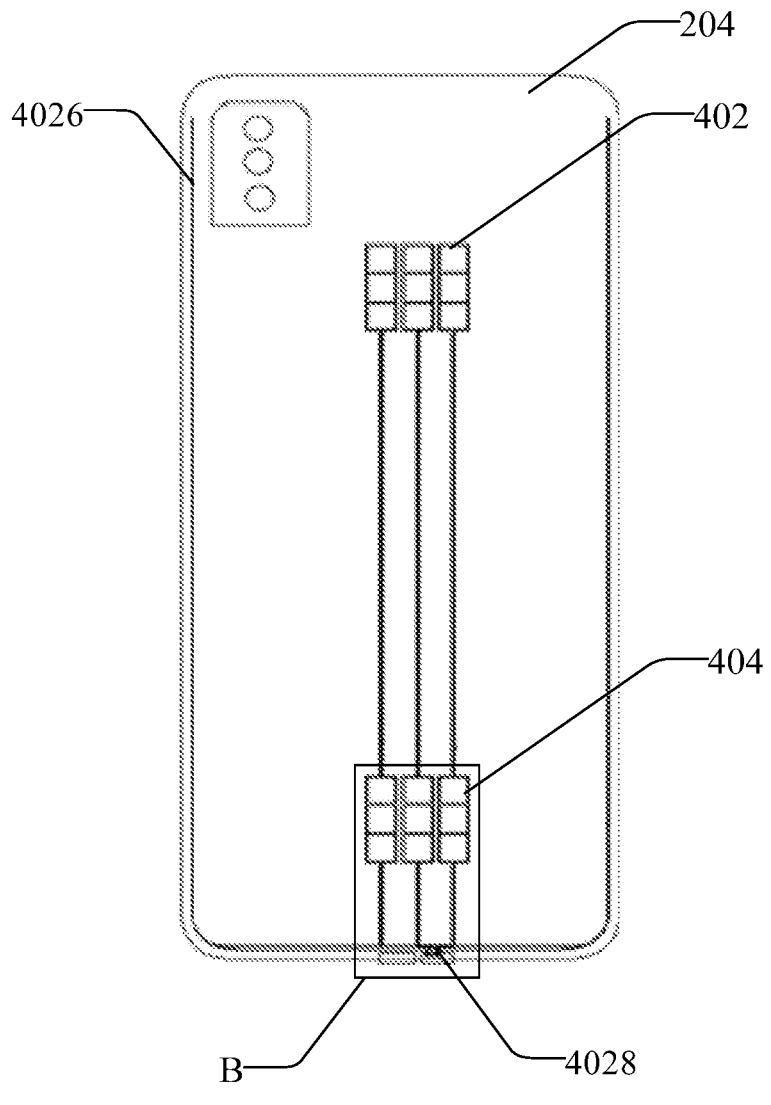
FIG. 3 is a second schematic structural diagram of an electrochromic device according to an embodiment of this application.
FIG. 4 is an enlarged view of area A in FIG. 2.

The second conductive layer includes a second conductive area and at least one second control module. As shown in FIG. 3, the second conductive area is a lower conductive area 204, the number of the at least one second control module is two, and the second control modules are both longitudinally disposed. The at least one second control module includes a first longitudinal control module 402 and a second longitudinal control module 404, where the first longitudinal control module 402 and the second longitudinal control module 404 are both separated from the lower conductive area 204.

It should be noted that a lateral pattern and a longitudinal pattern are designed based on a display requirement, and the patterns can be designed in the same way. A lateral control module and a longitudinal control module are designed correspondingly as an emission layer and a receiving layer of touch control respectively, and the positioning of touch coordinates is implemented through the lateral and longitudinal directions, to determine the touch position. The first lateral control module 302 and the first longitudinal control module 402 are designed to correspond and overlap up and down to implement electrochromic display at the same time. In this embodiment, the upper layer lateral direction and the lower layer longitudinal direction are used as examples, and the lower layer lateral direction and the upper layer longitudinal direction may also be used in a specific implementation. This is not limited herein.

FIG. 4 is an enlarged view of area A in FIG. 2. The first lateral control module 302 is a lateral conductive layer, which can be used as a receiving (Receive, RX) module of a touch sensor, and the number of the RX modules may be set based on a display requirement. The first lateral control module 302 includes the plurality of first submodules. As shown in FIG. 4, the first lateral control module 302 includes a first receive submodule RX11, a second receive submodule RX12, and a third receive submodule RX13, each of which is the first submodule. A receive module is designed based on a required position, then receiving subunits (i.e., control units) of each receive submodule are designed based on a display requirement, and the receive subunits are connected through a thin conductive layer.

Figure 5:
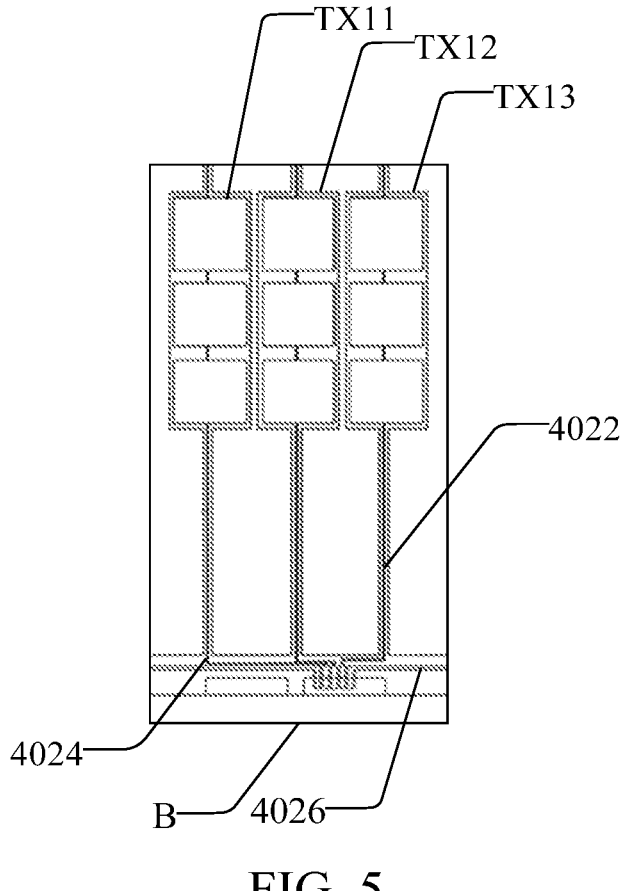
FIG. 5 is an enlarged view of area B in FIG. 3.

FIG. 5 is an enlarged view of area B in FIG. 3. The second longitudinal control module 404 is a longitudinal conductive layer, which can be used as a transport (TX) module of a touch sensor and matched with the RX module. The second longitudinal control module 404 includes the plurality of second submodules. As shown in FIG. 5, the second longitudinal control module 404 includes a first transmit submodule TX11, a second transmit submodule TX12, and a third transmit submodule TX13, each of which is the second submodule. A transmit module is designed based on a required position, then transmit subunits (i.e., control units) are designed based on a required position, and the transmit subunits are connected through a thin conductive layer.

The number of receive subunits and the number of transmit subunits are matched with each other. The control module may be square, or may be triangular, circular, bar, arrow, or the like.

It should be noted that the conductive area and the control module may be metal oxides, for example, conductive substances such as indium tin oxide and metal grid.

In an embodiment of this application, the electrochromic device further includes a plurality of first connection structures, where one end of the first connection structure is connected to the first submodule; and a first fixing area, disposed on the first substrate layer, where the first fixing area is used for fixing an other end of the first connection structure.

In this embodiment, the electrochromic device further includes the plurality of first connection structures and the first fixing area disposed on the first substrate layer, where one end of the first connection structure is connected to the first submodule, and the first fixing area is used for fixing the first connection structure. The first fixing area can be connected to a control device, and implement the transmission of a control signal of the first submodule and the receiving of a sensing signal of the first submodule through the first connection structure, thereby implementing the functions of local color change and local touch control of the electrochromic device and improving the flexibility of the color change and touch control modes. In addition, the first fixing area is used to fix the plurality of first connection structures, so that the wiring of the electrochromic device can be clear and not messy.

In an embodiment of this application, the first conductive layer further includes a first in-plane thin conductive layer, and a first connection line is arranged on the first conductive layer. The first in-plane thin conductive layer and the first connection line are combined into the first connection structure. The first in-plane thin conductive layer is connected to one end of the first connection line and the first submodule, and an other end of the first connection line is fixed to the first fixing area. The width of the first in-plane thin conductive layer is designed to be thin and the first in-plane thin conductive layer can be used as a wire. Designing a part of the first connection structure as the in-plane thin conductive layer avoids the use of the wire to affect the display effect of the electrochromic device.

In some embodiments, the first in-plane thin conductive layer may also be a wire, and when it is a wire, the width of the wire needs to be designed to be thin.

In an embodiment of this application, the electrochromic device further includes a plurality of second connection structures, where one end of the second connection structure is connected to the second submodule; and a second fixing area, disposed on the second substrate layer, where the second fixing area is used for fixing an other end of the second connection structure.

In this embodiment, the electrochromic device further includes the plurality of second connection structures and the second fixing area disposed on the second substrate layer, where one end of the second connection structure is connected to the second submodule, and the second fixing area is used for fixing the second connection structure. The second fixing area can be connected to a control device, and the second connection structure can be used to implement the transmission of a control signal of the second submodule and the reception of a sensing signal of the second submodule, thereby implementing the functions of local color change and local touch control of the electrochromic device and improving the flexibility of the color change mode and touch control mode. In addition, the second fixing area is used to fix the plurality of second connection structures, so that the wiring of the electrochromic device can be clear and not messy.

In an embodiment of this application, the second conductive layer further includes a second in-plane thin conductive layer, and a second connection line is arranged on the second conductive layer. The second in-plane thin conductive layer and the second connection line are combined into the second connection structure. The second in-plane thin conductive layer is connected to one end of the second connection line and the second submodule, and an other end of the second connection line is fixed to the second fixing area. The width of the second in-plane thin conductive layer is designed to be thin and the second in-plane thin conductive layer can be used as a wire. Designing a part of the second connection structure as the in-plane thin conductive layer avoids the use of the wire to affect the display effect of the electrochromic device.

In some embodiments, the second in-plane thin conductive layer may also be a wire, and when it is a wire, the width of the wire needs to be designed to be thin.

In an embodiment of this application, the electrochromic device further includes a third connection structure, where one end of the third connection structure is connected to the first conductive area, and an other end of the third connection structure is fixed to the first fixing area.

In this embodiment, the electrochromic device further includes a plurality of third connection structures, where one end of the third connection structure is connected to the first conductive area, and an other end of the third connection structure is fixed to the first fixing area. The third connection structure can be used to implement the transmission of a control signal of the first conductive area and the reception of a sensing signal of the first conductive area, thereby implementing the functions of color change and touch control of the first conductive area of the electrochromic device and improving the flexibility of the color change and touch control modes.

In an embodiment of this application, the electrochromic device further includes a fourth connection structure, where one end of the fourth connection structure is connected to the second conductive area, and an other end of the fourth connection structure is fixed to the second fixing area.

In this embodiment, the electrochromic device further includes a plurality of fourth connection structures, where one end of the fourth connection structure is connected to the second conductive area, and an other end of the fourth connection structure is fixed to the second fixing area. The fourth connection structure can be used to implement the transmission of a control signal of the second conductive area and the reception of a sensing signal of the second conductive area, thereby implementing the functions of color change and touch control of the second conductive area of the electrochromic device and improving the flexibility of the color change and touch control modes.

In an embodiment of this application, the electrochromic device further includes a control device movably connected to the first fixing area and the second fixing area, where the control device is configured to control the first control module and the second control module to be electrified to control the color change of the first color change area.

In this embodiment, the control device is connected to the first fixing area and the second fixing area to connect the first connection structure and the second connection structure. The control device transmits a control signal to the first control module through the first connection structure, and transmits a control signal to the second control module through the second connection structure, to implement the function of local color change of the electrochromic device. In some embodiments, the control device receives a sensing signal sent by the first control module through the first connection structure and a sensing signal sent by the second control module through the second connection structure, to implement the function of local touch control of the electrochromic device. In the foregoing manner, the flexibility of the color change and the touch control modes is improved.

It should be noted that the control device is movably connected to the first fixing area and the second fixing area, and the control device is rotatable relative to the first fixing area and/or the second fixing area. When the electrochromic device is applied to the cover plate of the electronic device, the control device can be fastened in the electronic device to improve the practicability.

In an embodiment of this application, the control device is further configured to control the first conductive area and the second conductive area to be electrified to control the color change of the second color change area.

In this embodiment, the control device is connected to the first fixing area and the second fixing area to connect the third connection structure and the fourth connection structure. The control device transmits a control signal to the first conductive area through the third connection structure, and transmits a control signal to the second conductive area through the fourth connection structure, to implement the function of color change of the conductive area of the electrochromic device. In some embodiments, the control device receives a sensing signal sent by the first conductive area through the third connection structure and a sensing signal sent by the second conductive area through the fourth connection structure, to implement the function of touch control of the conductive area of the electrochromic device. In the foregoing manner, the flexibility of the color change and the touch control modes is improved.

In an embodiment, as shown in FIG. 2 to FIG. 5, the first connection structure includes a first in-plane thin conductive layer 3022 and a receive module edge wire 3024 (i.e., first connection line), and the first in-plane thin conductive layer 3022 is used for communicating the first lateral control module 302 with the receive module edge wire 3024. The second connection structure includes a second in-plane thin conductive layer 4022 and a transmit module edge wire 4024 (i.e., second connection line), and the second in-plane thin conductive layer 4022 is used for communicating the second longitudinal control module 404 with the transmit module edge wire 4024.

The third connection structure 3026 is used for connecting the upper conductive area 202 and the first fixing area 3028, and the fourth connection structure 4026 is used for connecting the lower conductive area 204 and the second fixing area 4028. The third connection structure 3026 and the fourth connection structure 4026 are both wires.

The receive module edge wire 3024, the transmit module edge wire 4024, the third connection structure 3026, and the fourth connection structure 4026 may be low-resistance conductive materials such as metal Ag and copper Cu.

Figure 6:
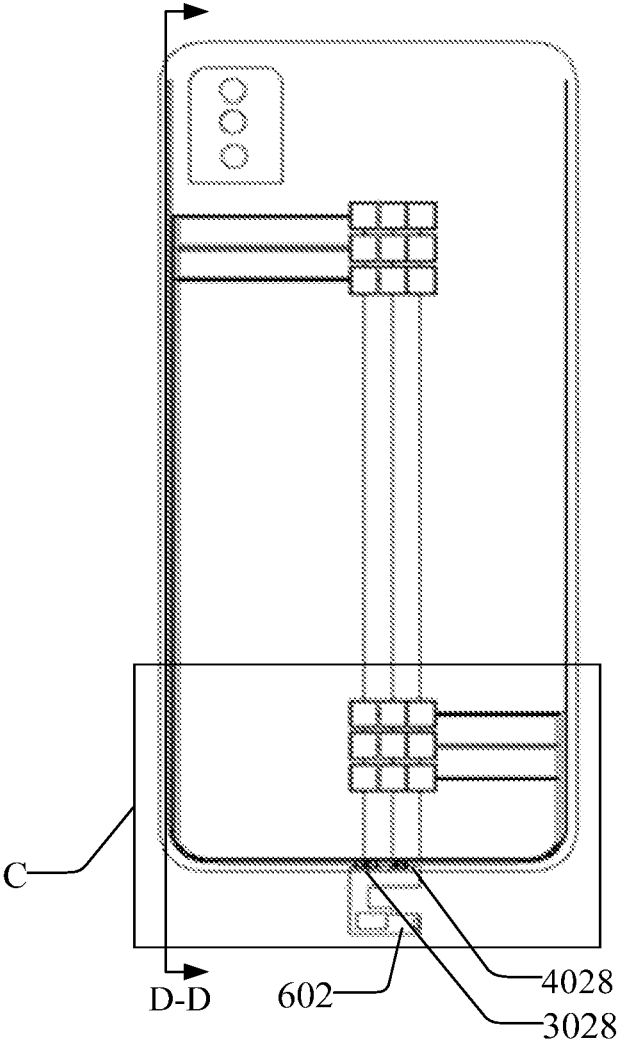
FIG. 6 is a third schematic structural diagram of an electrochromic device according to an embodiment of this application.
Figure 7:
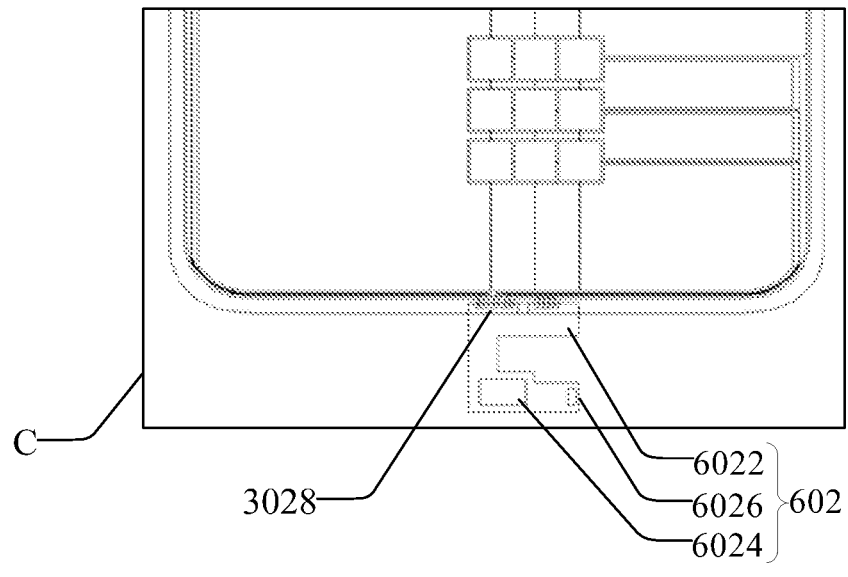
FIG. 7 is an enlarged view of area C in FIG. 6.

FIG. 6 is a structural diagram of an electrochromic device where an upper substrate layer 102 and a lower substrate layer 104 are combined and the combination is disposed behind a cover plate 902 of an electronic device. FIG. 7 is an enlarged view of area C in FIG. 6. As shown in FIG. 6 and FIG. 7, a control device 602 is movably connected to the upper substrate layer 102 and the lower substrate layer 104. The control device 602 includes a Flexible Printed Circuit (FPC) 6022, a control chip and peripheral components 6024, and an FPC interface 6026. The FPC interface 6026 can be buckled with a main board of the electronic device to implement communication with the electronic device.

On one hand, the control device 602 is in communication with the receive module edge wire 3024 through the first fixing area 3028 and in communication with the transmit module edge wire 4024 through the second fixing area 4028. After receiving a control signal sent by the main board of the electronic device, the control device 602 transmits the control signal to the first lateral control module 302 and the first longitudinal control module 402 through the receive module edge wire 3024 and the transmit module edge wire 4024, to implement the local color development of the electrochromic device. In some embodiments, the control device 602 transmits a sensing signal of the first lateral control module 302 and the first longitudinal control module 402 to the main board of the electronic device through the receive module edge wire 3024 and the transmit module edge wire 4024, so that the main board of the electronic device can correspondingly process a touch input.

On the other hand, after receiving the control signal sent by the main board of the electronic device, the control device 602 transmits the control signal to the upper conductive area 202 and the lower conductive area 204 through the third connection structure 3026 and the fourth connection structure 4026, to implement color development of the conductive area of the electrochromic device. In some embodiments, the control device 602 transmits a sensing signal of the upper conductive area 202 and the lower conductive area 204 to the main board of the electronic device through the third connection structure 3026 and the fourth connection structure 4026, so that the main board of the electronic device can correspondingly process a touch input in the conductive area.

In an embodiment of this application, the electrochromic device further includes at least one electrochromic isolating layer, where the electrochromic isolating layer separates two adjacent first control units or two adjacent second control units.

In this embodiment, the electrochromic device further includes an electrochromic isolating layer, where the electrochromic isolating layer is perpendicular to the first control module to separate two adjacent first control units, or is perpendicular to the second control module to separate two adjacent second control units. In the foregoing manner, independent color change of local units can be implemented, and color change units can be prevented from affecting adjacent non-color change units, thereby improving the display effect.

In an embodiment of this application, the electrochromic device further includes a seal structure connected to the first substrate layer and the second substrate layer.

In this embodiment, the electrochromic device further includes a seal structure that connects the first substrate layer and the second substrate layer. The seal structure seals the structure between the first substrate layer and the second substrate layer, and prevents substances such as dust and water from polluting the structure between the first substrate layer and the second substrate layer.

Figure 8:
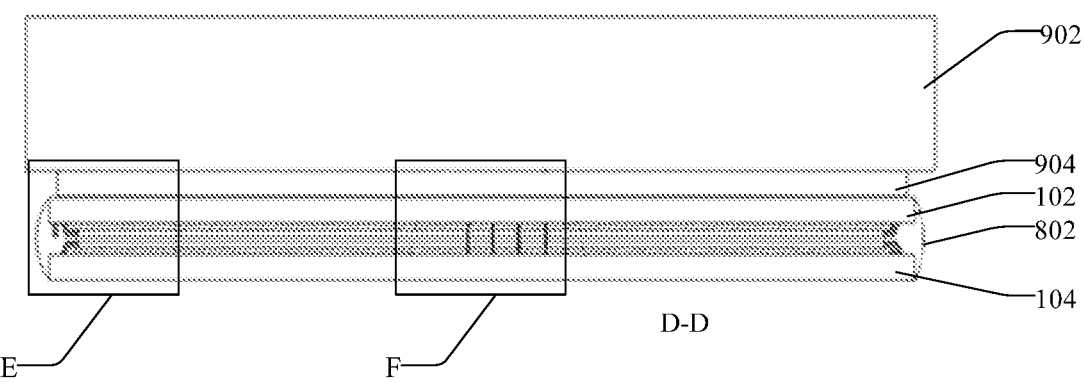
FIG. 8 is a sectional view of FIG. 6 along D-D.
Figure 9:
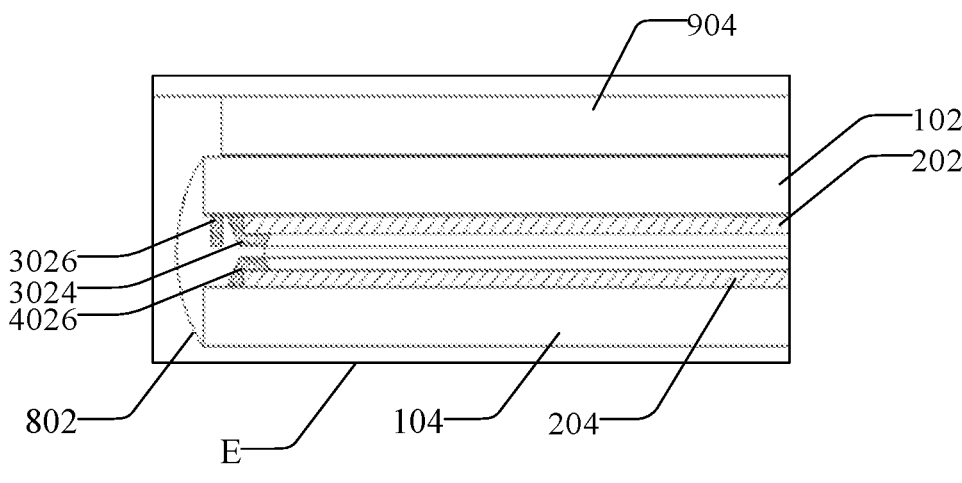
FIG. 9 is an enlarged view of area E in FIG. 8.
Figure 10:
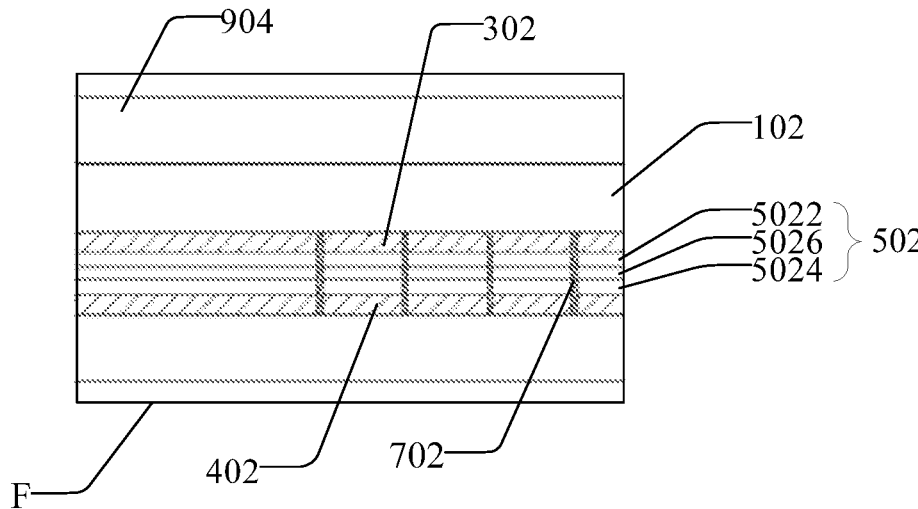
FIG. 10 is an enlarged view of area F in FIG. 8.

In an embodiment, FIG. 8 is a sectional view along D-D of FIG. 6, FIG. 9 is an enlarged view of area E in FIG. 8, and FIG. 10 is an enlarged view of area F in FIG. 8. As shown in FIG. 8 to FIG. 10, the electrochromic layer 502 includes an electrochromic material layer 5022, an ion storage layer 5024, and an electrolyte layer 5026. The ion storage layer 5024 is used for providing ions to the electrochromic material layer 5022, and the electrolyte layer 5026 is disposed between the electrochromic material layer 5022 and the ion storage layer 5024 to serve as a module for transmitting ions between the electrochromic material layer 5022 and the ion storage layer 5024. It should be noted that the electrochromic layer 502 is quite mature in the related art, and is not described herein again.

The electrochromic device is further disposed with a plurality of electrochromic isolating layers 702 (i.e., electrochromic isolating post). The electrochromic isolating layer 702 is perpendicular to the first control module to separate two adjacent receive subunits on the first lateral control module 302, or the electrochromic isolating layer 702 is perpendicular to the second control module to separate two adjacent transmit subunits on the first longitudinal control module 402. The subunits between the two electrochromic isolating layers 702 are independently controlled by the control module, so that independent color change of the local units can be implemented, to be distinguished from the adjacent units whose color is unchanged. The electrochromic isolating layer 702 may be made of a material such as a photoresist.

The electrochromic device further includes a seal structure, that is, an edge sealant 802, which plays a sealing role and prevents substances such as dust and water from polluting the electrochromic device.

In this embodiment of this application, the control device 602 controls line by line whether to light the subunits to implement color change, and the size of the subunits is designed based on a display requirement. For example, when games are played with a 4 mm single finger on the back of the electronic device, only 9 subunits of each of the first lateral control module 302 and the first longitudinal control module 402 are needed.

Figure 11:
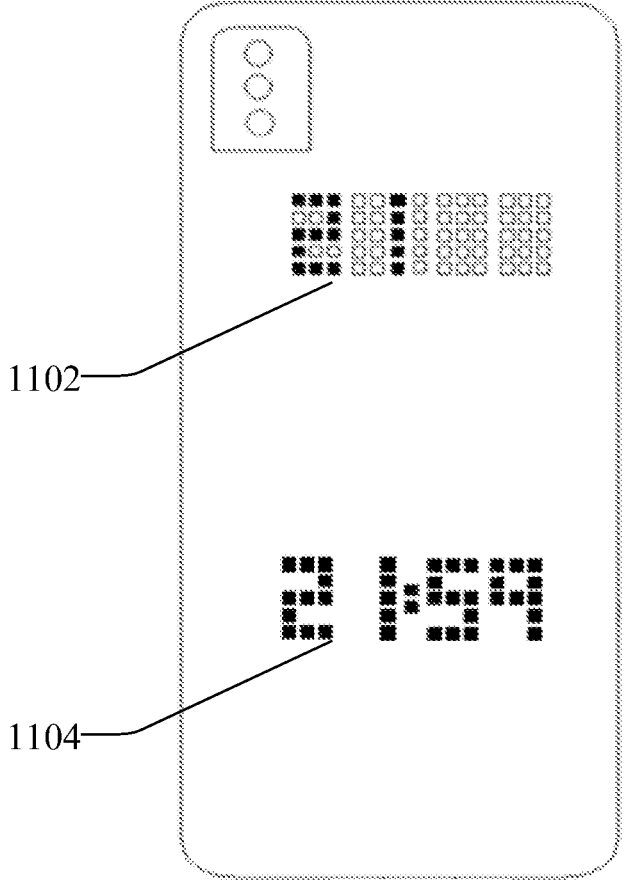
FIG. 11 is a schematic diagram of a display effect of an electrochromic device according to an embodiment of this application.

FIG. 2 to FIG. 10 use an example in which the receive submodule is six rows and three columns, and the transmit submodule is six rows and three columns for description, and n rows and m columns can also be designed based on requirements. As shown in FIG. 11, a plurality of rows and columns are designed based on requirements, the size of the subunits is reduced to form pixel points, and the entire pattern is displayed by lighting control of each point. 1102 is a pattern lighting local subunits, and 1104 is a final display pattern. By controlling the color change of each subunit by the voltage of the row and column, the required pattern is displayed. In some embodiments, RX1 to RX (n) and TX1 to TX (m) are controlled in time division line by line to be electrified, and the color change technology can complete the color change within milliseconds, thereby quickly implementing the formation of one pattern. For example, to implement display of a clock, by controlling local electrochromic color change, a pattern different from the unchanged color is displayed, and a function of mutual capacitance touch control is implemented. When touch control is needed, the transmit submodule outputs a signal, and the receive submodule receives the signal, which is processed by the control device to detect the touch position. It should be noted that the receive submodule can be designed in the upper layer or the lower layer, and the transmit submodule can be designed on the other one of the upper layer or the lower layer.

In this embodiment of this application, on one hand, the control module on the upper or lower substrate layer is divided into small control units, and the functions of local color change and touch control are implemented by controlling each small control unit. On the other hand, by adding an isolating layer, independent color change of the small control units can be controlled to improve the display effect. On the other hand, an independent control device is designed to control the display touch control and the entire electrochromic device by time division multiplexing.

An embodiment of this application further provides an electronic device, including a cover plate; and the electrochromic device according to the foregoing embodiments, where the electrochromic device is disposed on the cover plate.

In this embodiment, as shown in FIG. 8, the electronic device includes the cover plate 902 and the electrochromic device according to the foregoing embodiments, where the electrochromic device is disposed on the cover plate 902. In some embodiments, the cover plate 902 is bonded to the upper substrate layer 102 of the electrochromic device. In the foregoing manner, a local pattern changeable function of the cover plate 902 of the electronic device can be implemented, for example, time or another pattern is displayed on the cover plate 902 of the electronic device, and the function of local touch control of the cover plate 902 of the electronic device is implemented, to achieve power saving of the electronic device, increase the function of the cover plate of the electronic device, and implement the differentiation of the electronic device.

It should be noted that the cover plate of the electronic device in this embodiment of this application may be a 2D cover plate, a 3D cover plate, or the like.

In an embodiment of this application, the electronic device further includes a connector for bonding the electrochromic device to the cover plate.

In this embodiment, as shown in FIG. 9 and FIG. 10, a connector 904, such as an optical double-sided adhesive tape, is disposed between the cover plate 902 and the upper substrate layer 102 of the electrochromic device. That is, the cover plate 902 and the upper substrate layer 102 are bonded to a double-sided adhesive tape to implement the functions of local color change and touch control of the cover plate 902 of the electronic device.

Figure 12:
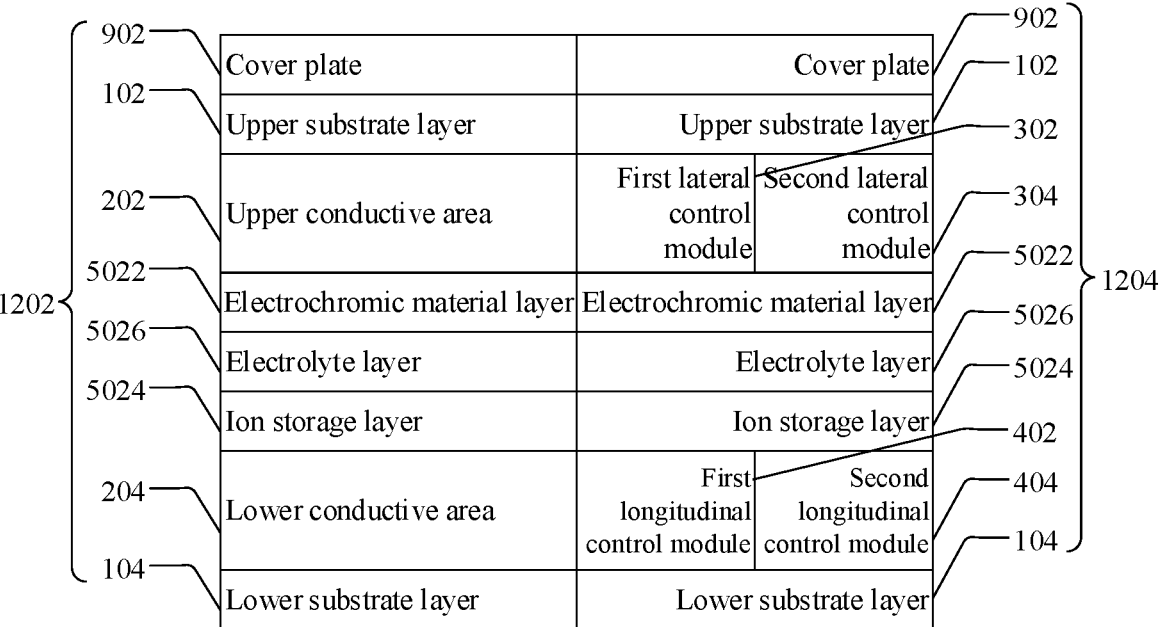
FIG. 12 is a schematic structural diagram of an electronic device according to an embodiment of this application.

In an embodiment, as shown in FIG. 12, the electronic device of this embodiment of this application is divided into a first image display area 1202 and a second pattern display area 1204. The first image display area 1202 includes a cover plate 902, an upper substrate layer 102, an upper conductive area 202, an electrochromic material layer 5022, an electrolyte layer 5026, an ion storage layer 5024, a lower conductive area 204, and a lower substrate layer 104; The second pattern display area 1204 includes a cover plate 902, an upper substrate layer 102, a first lateral control module 302 and a second lateral control module 304, an electrochromic material layer 5022, an electrolyte layer 5026, an ion storage layer 5024, a first longitudinal control module 402 and a second longitudinal control module 404, and a lower substrate layer 104.

The electronic device may be a mobile electronic device or may be a non-mobile electronic device. For example, the mobile electronic device may be a mobile phone, a tablet computer, a laptop computer, a handheld computer, an on-board electronic device, a wearable device, an Ultra-Mobile Personal Computer (UMPC), a netbook, or a Personal Digital Assistant (PDA), and the non-mobile electronic device may be a server, a Network Attached Storage (NAS), a Personal Computer (PC), a Television (TV), a teller machine, or self-service machine, which are not specifically limited in this embodiment of this application.

It should be noted that the terms "include", "comprise", or any other variation thereof in this specification is intended to cover a non-exclusive inclusion, which specifies the presence of stated processes, methods, objects, or devices, but do not preclude the presence or addition of one or more other processes, methods, objects, or devices. Without more limitations, elements defined by the sentence "including one" does not exclude that there are still other same elements in the processes, methods, objects, or apparatuses. In addition, it should be pointed out that the scope of the methods and apparatuses in the embodiments of this application is not limited to performing the functions in the order shown or discussed, but also can include performing the functions in basically the same way or in the opposite order according to the functions involved, for example, the described methods can be performed in a different order from the described ones, and various steps can also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and may be implemented by hardware. Based on such an understanding, the technical solutions in this application essentially or the part contributing to the reflected technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. An electrochromic device, comprising:
   a first substrate layer, a first conductive layer, an electrochromic layer, a second conductive layer, and a second substrate layer, wherein:
   the first substrate layer, the first conductive layer, the electrochromic layer, the second conductive layer, and the second substrate layer are stacked in sequence;
   the first conductive layer comprises a first conductive area and a first control module, wherein the first control module is separated from the first conductive area;
   the second conductive layer comprises a second conductive area and a second control module, wherein the second control module is separated from the second conductive area and opposite to the first control module;
   the electrochromic layer comprises a first color change area and a second color change area, wherein the first color change area is opposite to the first control module and the second control module, and the second color change area is opposite to the first conductive layer and the second conductive layer; and the first control module and the second control module are configured to control the color change of the first color change area.

2. The electrochromic device according to claim 1, wherein the first control module comprises:

a plurality of first submodules, wherein the plurality of first submodules are connected in parallel to each other, each first submodule comprises a plurality of first control units, and the plurality of first control units are connected in sequence; and the second control module comprises:

a plurality of second submodules, wherein the plurality of second submodules are connected in parallel to each other, each second submodule comprises a plurality of second control units, and the plurality of second control units are connected in sequence.

3. The electrochromic device according to claim 2, wherein:

the plurality of first control units are arranged in a first direction; and the plurality of second control units are arranged in a second direction, wherein the second direction is perpendicular to the first direction.

4. The electrochromic device according to claim 2, further comprising:

at least one electrochromic isolating layer, wherein the at least one electrochromic isolating layer separates adjacent two first control units or adjacent two second control units.

5. The electrochromic device according to claim 2, further comprising:

a plurality of first connection structures, wherein one end of a first connection structure of the plurality of first connection structures is connected to the first submodule; and a first fixing area, disposed on the first substrate layer, wherein the first fixing area is used for fixing another end of the first connection structure.

6. The electrochromic device according to claim 5, further comprising:

a plurality of second connection structures, wherein one end of a second connection structure of the plurality of second connection structures is connected to the second submodule; and a second fixing area, disposed on the second substrate layer, wherein the second fixing area is used for fixing another end of the second connection structure.

7. The electrochromic device according to claim 6, further comprising:

a third connection structure, wherein one end of the third connection structure is connected to the first conductive area, and another end of the third connection structure is fixed to the first fixing area; or a fourth connection structure, wherein one end of the fourth connection structure is connected to the second conductive area, and an other another end of the fourth connection structure is fixed to the second fixing area.

8. The electrochromic device according to claim 6, further comprising:

a control device, movably connected to the first fixing area and the second fixing area, wherein the control device is configured to control the first control module and the second control module to be electrified to control the color change of the first color change area; and the control device is further configured to control the first conductive area and the second conductive area to be electrified to control the color change of the second color change area.

9. The electrochromic device according to claim 1, further comprising:

a seal structure, connected to the first substrate layer and the second substrate layer.

10. An electronic device, comprising:

a cover plate; and an electrochromic device, wherein the electrochromic device is disposed on the cover plate, and the electrochromic device comprises a first substrate layer, a first conductive layer, an electrochromic layer, a second conductive layer, and a second substrate layer, wherein:

the first substrate layer, the first conductive layer, the electrochromic layer, the second conductive layer, and the second substrate layer are stacked in sequence;

the first conductive layer comprises a first conductive area and a first control module, wherein the first control module is separated from the first conductive area;

the second conductive layer comprises a second conductive area and a second control module, wherein the second control module is separated from the second conductive area and opposite to the first control module;

the electrochromic layer comprises a first color change area and a second color change area, wherein the first color change area is opposite to the first control module and the second control module, and the second color change area is opposite to the first conductive layer and the second conductive layer; and the first control module and the second control module are configured to control the color change of the first color change area.

11. The electronic device according to claim 10, wherein the first control module comprises:

a plurality of first submodules, wherein the plurality of first submodules are connected in parallel to each other, each first submodule comprises a plurality of first control units, and the plurality of first control units are connected in sequence; and the second control module comprises:

a plurality of second submodules, wherein the plurality of second submodules are connected in parallel to each other, each second submodule comprises a plurality of second control units, and the plurality of second control units are connected in sequence.

12. The electronic device according to claim 11, wherein:

the plurality of first control units are arranged in a first direction; and the plurality of second control units are arranged in a second direction, wherein the second direction is perpendicular to the first direction.

13. The electronic device according to claim 11, wherein the electrochromic device further comprises:

at least one electrochromic isolating layer, wherein the at least one electrochromic isolating layer separates adjacent two first control units or adjacent two second control units.

14. The electronic device according to claim 11, wherein the electrochromic device further comprises:

a plurality of first connection structures, wherein one end of a first connection structure of the plurality of first connection structures is connected to the first submodule; and a first fixing area, disposed on the first substrate layer, wherein the first fixing area is used for fixing another end of the first connection structure.

15. The electronic device according to claim 14, wherein the electrochromic device further comprises:

a plurality of second connection structures, wherein one end of a second connection structure of the plurality of second connection structures is connected to the second submodule; and a second fixing area, disposed on the second substrate layer, wherein the second fixing area is used for fixing another end of the second connection structure.

16. The electronic device according to claim 15, wherein the electrochromic device further comprises:

a third connection structure, wherein one end of the third connection structure is connected to the first conductive area, and an other another end of the third connection structure is fixed to the first fixing area; or a fourth connection structure, wherein one end of the fourth connection structure is connected to the second conductive area, and an other another end of the fourth connection structure is fixed to the second fixing area.

17. The electronic device according to claim 15, wherein the electrochromic device further comprises:

a control device, movably connected to the first fixing area and the second fixing area, wherein the control device is configured to control the first control module and the second control module to be electrified to control the color change of the first color change area; and the control device is further configured to control the first conductive area and the second conductive area to be electrified to control the color change of the second color change area.

18. The device according to claim 10, wherein the electrochromic device further comprises:

a seal structure, connected to the first substrate layer and the second substrate layer.

* * * * *